United States Patent [19]
Fahey et al.

[11] 4,216,866
[45] Aug. 12, 1980

[54] APPARATUS FOR RACKING SHEET MATERIALS

[75] Inventors: Thomas D. Fahey, Denver; George P. McGannon, Westminster, both of Colo.

[73] Assignee: McCallin Steel Storage Systems, Inc., Commerce City, Colo.

[21] Appl. No.: 941,200

[22] Filed: Sep. 11, 1978

[51] Int. Cl.² ............................................. A47F 5/00
[52] U.S. Cl. ..................................... 211/1.5; 108/21; 211/151; 414/282
[58] Field of Search ............................ 211/1, 151, 1.5; 312/306; 414/281, 277, 282; 108/20, 21

[56] References Cited
U.S. PATENT DOCUMENTS

| | | | |
|---|---|---|---|
| 3,465,897 | 9/1969 | Shumann et al. | 211/151 |
| 3,708,074 | 1/1973 | Fahey et al. | 211/151 |
| 4,073,382 | 2/1978 | Fahey et al. | 211/1 |

Primary Examiner—Roy D. Frazier
Assistant Examiner—Robert W. Gibson, Jr.
Attorney, Agent, or Firm—Edwin L. Spangler, Jr.

[57] ABSTRACT

This invention relates to an apparatus for racking sheet materials characterized by an open-sided generally box-like rack having opposed sets of horizontally-disposed guiderails arranged in stacked relation one above the other to define tray tracks along the inside of the front and rear walls thereof. Slat-bottomed double-ended trays are mounted on the tracks for independent movement from a retracted position essentially centered within the rack to either one of two extended positions overhanging a side of the latter. Tray transfer means are provided for each tray accessible in the center of one end of the rack operative upon actuation, to drive a particular tray in either direction between its retracted and extended positions. A tool carriage is mounted on vertically-disposed tracks on the end of the rack with access to the tray transfer means for movement therealong into alignment with any of the tray transfer means. A tray transfer drive is mounted on said tool carriage for relative movement between a disengaged position and an engaged position operatively coupled to a selected tray transfer means upon being aligned therewith. And, a control mechanism interconnecting said tray transfer drive and a tray responsive to movement of the tray into one of its fully-extended positions, and partially disabling said transfer means by preventing its being used to move the extended tray in the direction in which it is extended.

10 Claims, 17 Drawing Figures

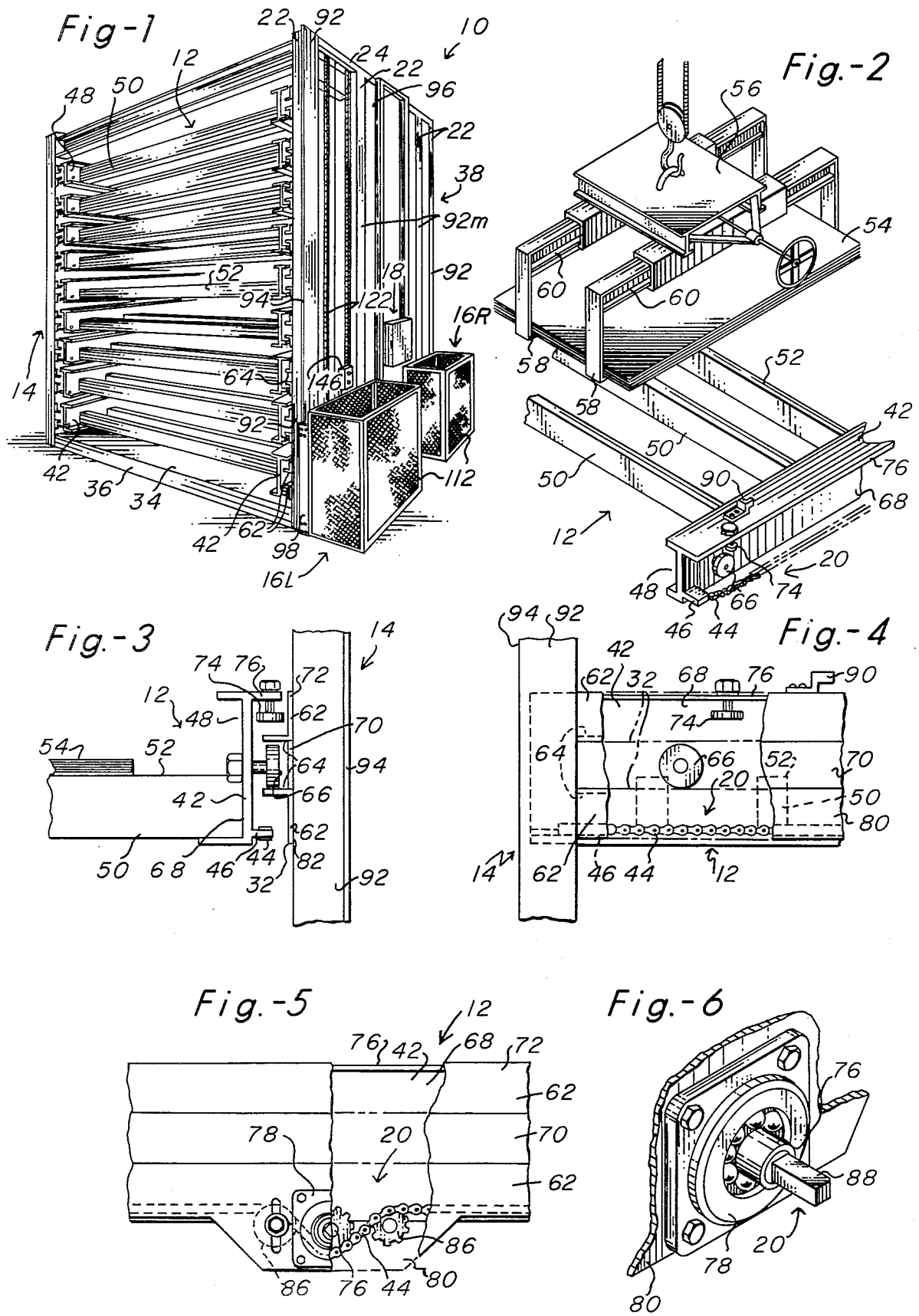

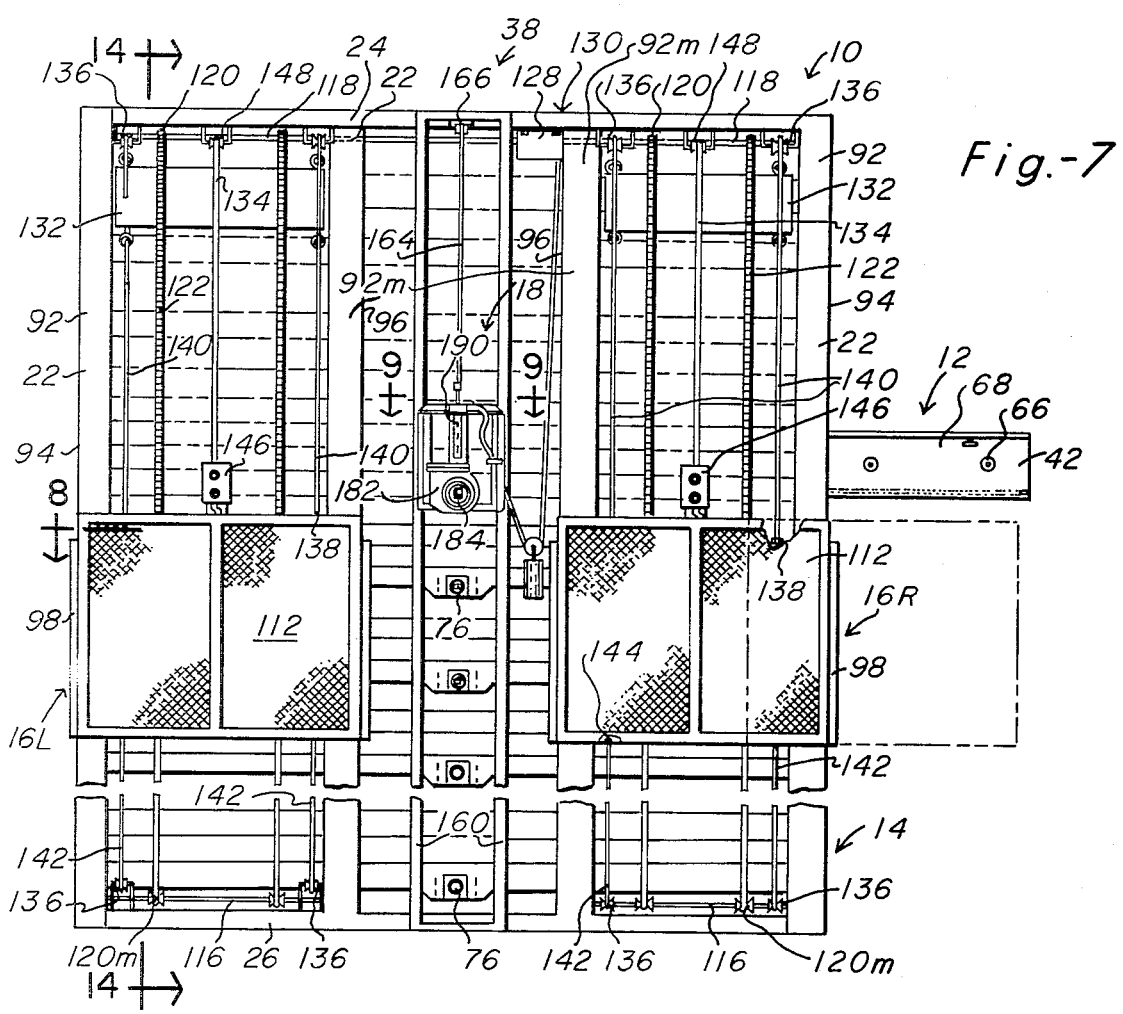
Fig.-7
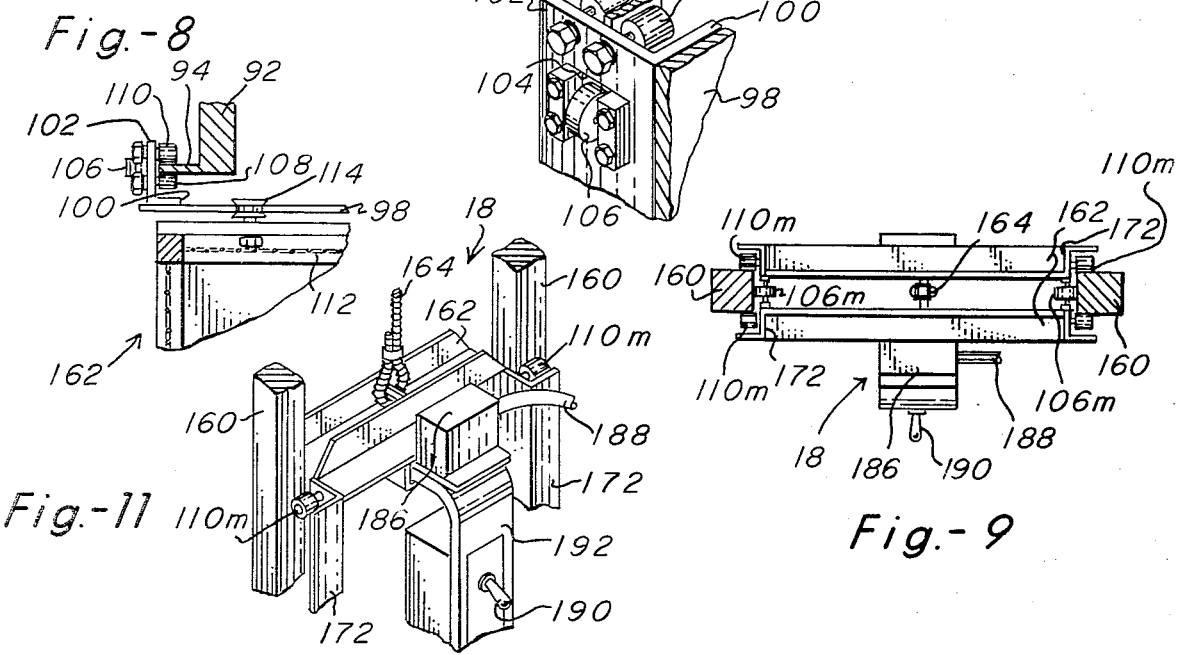
Fig.-10
Fig.-8
Fig.-11
Fig.-9

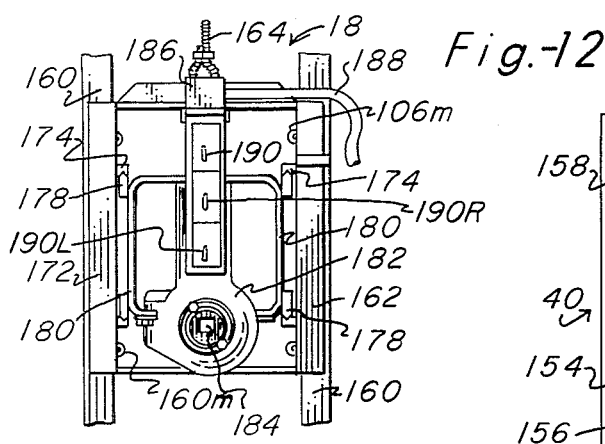
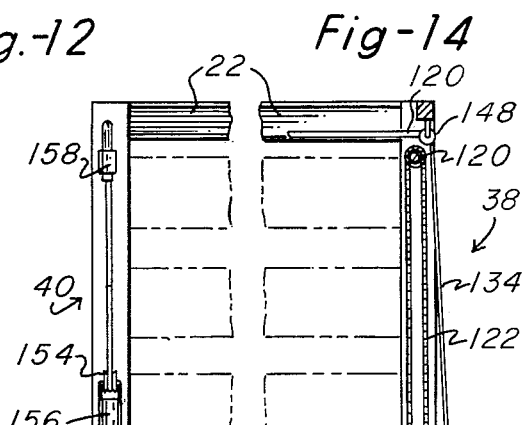
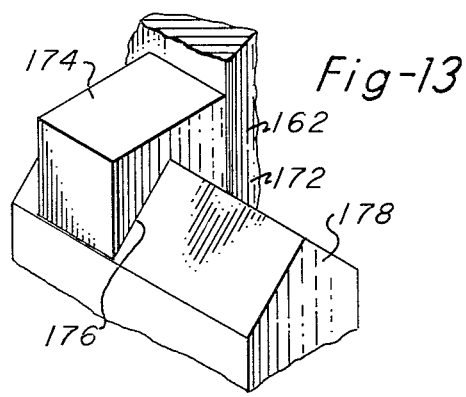
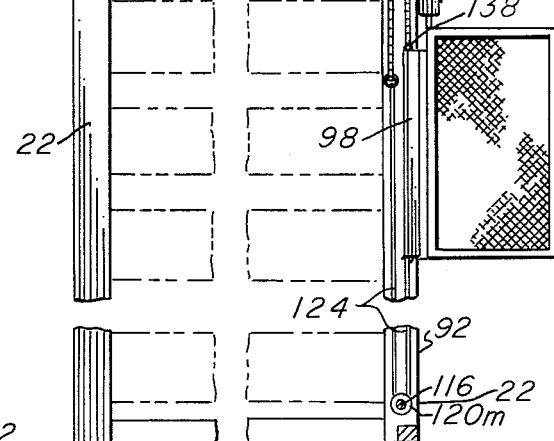
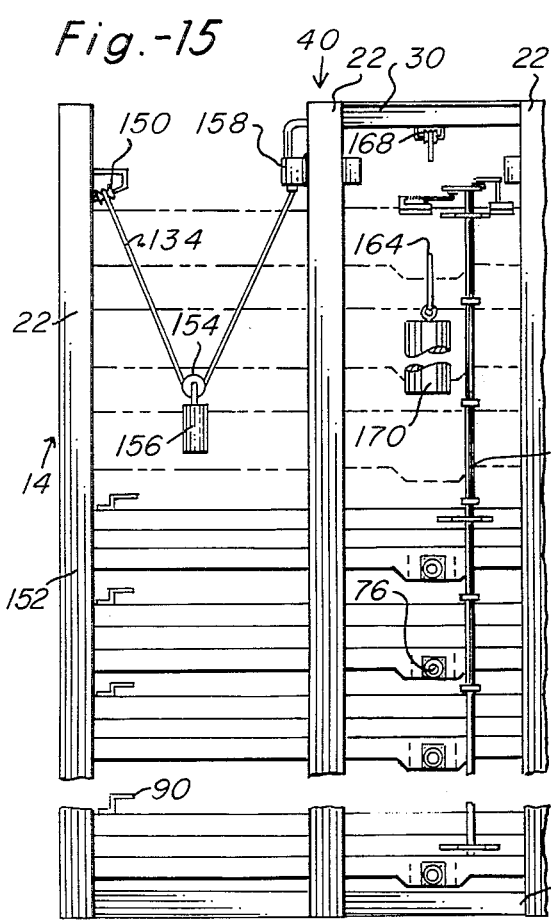
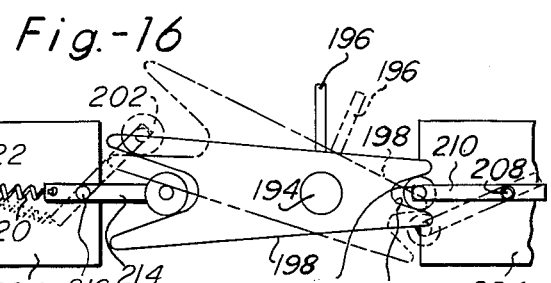
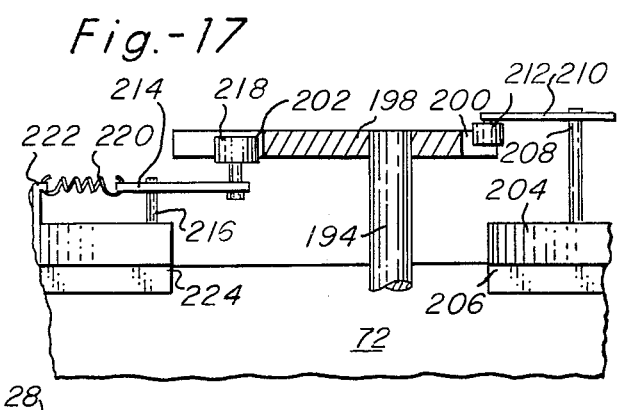

APPARATUS FOR RACKING SHEET MATERIALS

In our U.S. Pat. No. 4,073,382, the assignee hereof disclosed a steel-racking apparatus characterized by two tiers of open-sided drawer-like receptacles especially designed to receive and store elongate structural members like, for example, pipe, tubes, beams, rods and the like. Both tiers of drawers were arranged in back-to-back relation inside a common centrally-positioned rack. Each drawer moved independently of the others out only one side of the rack but nothing prevented two or more drawers of the same or other tier from being opened at the same time nor did it make much difference since the drawers did not open very far and the center of mass of the loads carried therein stayed in relatively close to the rack where it would become virtually impossible to create a condition of imbalance sufficient to tip the apparatus over even if all the drawers on one side were open while those in the other tier were left closed. A single elevator ran up and down the rack at one end thereof in the usual fashion but, in addition, it had the capability of shifting laterally to either side where the drawer-actuating controls for each tier were located. In fact, when used as the center racking apparatus in a set of three, only the middle one needed to be equipped with an elevator since the operator could use it to service the adjacent tiers in the units alongside thereof.

Elongate structural shapes and the like are, of course, but one type of material handled in a steel warehousing or fabricating operation and, when the time came to adapt the principles of the aforementioned patented rack to sheet materials, it was found to be seriously deficient. To begin with, the loads were heavier and the horizontal area thereof was substantially greater thus necessitating the use of receptacles or other extendable supports which opened a great deal farther than the open-ended drawers of the earlier rack. Even the conventional equipment used around a warehouse for handling the two different types of material (sheets vs. beams, etc.) differed substantially and, for this reason, demanded specially designed receptacles to be compatible therewith.

For these and other reasons it became apparent that, for all practical purposes, the sheet-racking apparatus had to be completely redesigned although, as will appear presently, certain concepts that proved successful in the earlier unit were carried over into the instant one in modified form. To begin with, back-to-back tiers of receptacles portended serious problems of imbalance, potentially dangerous overhanging loads, extra heavy structures, difficulties with the drive mechanism, etc.; therefore, the double-tiered concept was bypassed in favor of a novel single tier of trays extendable on either side of a central support structure that utilizes the load on one end of the tray to partially counterbalance the overhanging load on the other end thereof when extended. Then, instead of separate drawer-actuating mechanisms for each drawer of back-to-back tiers thereof, only a single set of tray transfer mechanisms were needed placed centrally in the rack.

As far as the elevator is concerned, the overall much greater width of the sheet rack suggested that the single elevator of the earlier unit be replaced by a double-cage elevator, each cage being offset toward one side of the unit while retaining the capability of moving sidewise to better control the loading and unloading of an extended tray. Both cages, when retracted, lie offset alongside the center column in position to raise and lower the tray transfer drive mechanism as well as couple and decouple the latter from a particular one.

One of the most novel features, however, was the design of a lock-out mechanism which uniquely combined a tray actuated switch with a reversible electric motor so as to effectively prevent a second tray from being extended until the first one was retracted thus insuring that no more than one loaded tray overhangs the rack at a time.

Running up and down the center of the rack on rails is a single tray transfer mechanism drive selectively coupleable to individual tray transfer mechanisms for the purpose of extending and retracting them. This drive is reversible and accessible from either of the two elevator cages.

It is, therefore, the principal object of the present invention to provide a novel and improved racking apparatus for sheet materials and the like.

A second objective is the provision of a device of the class described which is particularly well suited to the storage and retrieval of heavy sheet materials such as steel plate and the like that must be loaded and unloaded with overhead cranes.

Another object of the within described invention is to provide a rack with extendable slat-bedded trays capable of supporting the sheets in position to be placed and retrieved by hooks hooked under opposite marginal edges thereof.

Still another object is to provide a rack for sheet steel and the like using double-ended trays, half of which are loaded from one side and the other half from the opposite side with one loaded half effectively counterbalancing the other when the latter is extended.

An additional object is the provision of a rack of the type aforementioned wherein the trays themselves in fully-extended position effectively program the tray actuator drive so that it cannot function to extend a second tray until the first tray is retracted.

Further objects are to provide a sheet material racking apparatus which is versatile, safe, reliable, easy to operate, rugged, compact and even somewhat decorative.

Other objects will be in part apparent and in part pointed out specifically hereinafter in connection with the description of the drawings that follows, and in which:

FIG. 1 is a perspective view showing the racking apparatus in its entirety;

FIG. 2 is a fragmentary perspective view to an enlarged scale showing a conventional sheet pick-up mechanism and overhead crane being used to load a stack of sheets onto an extended tray;

FIG. 3 is a fragmentary end view to a further enlarged scale showing the manner in which the trays are mounted for movement on tracks within the rack;

FIG. 4 is a fragmentary front elevation to the same scale as FIG. 3, portions of which have been broken away to more clearly reveal the side of the tray;

FIG. 5 is a fragmentary front elevation, again to the same scale as FIGS. 3 and 4 and with portions broken away to expose one of the individual tray transfer mechanisms;

FIG. 6 is a fragmentary perspective view to still a further enlarged scale showing the drive shaft of the tray transfer mechanism;

FIG. 7 is a front elevation showing the entire racking apparatus to a slightly larger scale than that used in FIG. 1 and having portions thereof broken away to conserve space;

FIG. 8 is a fragmentary section to a slightly enlarged scale taken along line 8 of FIG. 7;

FIG. 9 is a fragmentary section to a somewhat larger scale than FIG. 8 taken along line 9—9 of FIG. 7;

FIG. 10 is a fragmentary perspective view to a larger scale than FIG. 8 that shows the same features of the apparatus from a slightly different angle;

FIG. 11 is a fragmentary perspective view to the same scale as FIG. 9 and directed to the same subject matter;

FIG. 12 is a fragmentary front elevation to the same scale as FIGS. 10 and 11 which, once again, deals with the same subject matter;

FIG. 13 is a greatly enlarged fragmentary perspective showing the details of the rail subassembly upon which the tray transfer mechanism drive rides into and out of operative engagement with the tray transfer mechanism;

FIG. 14 is a side elevation of the rack without its tray to approximately the same scale as FIG. 7 but with portions thereof broken away to conserve space;

FIG. 15 is a rear elevation of the rack to the same scale as FIGS. 7 and 14, once again, with portions broken away to conserve space;

FIG. 16 is a fragmentary top plan view to a much enlarged scale showing the details of the control mechanism for disabling the tray transfer mechanism drive insofar as actuating the latter in a direction to further extend an extended tray; and, FIG. 17 is a fragmentary elevation of the same control mechanism shown in FIG. 16.

Referring next to the drawings for a detailed description of the subject matter depicted therein and, initially, to FIGS. 1, 7, 14 and 15 thereof wherein the entire unit is shown, reference numeral 10 has been selected to broadly designate the racking apparatus in its entirety while numerals 12 and 14 have been similarly used to refer to the trays and the box-like frame housing them, respectively. In like manner, numeral 16 broadly designates the double-cage elevator, the cage on the right being 16R and the one on the left 16L. Between these cages is located the drive that has been generally referred to by reference numeral 18 and which moves both vertically and from front to rear into selective and independent operative engagement with one of the tray transfer mechanisms that have also been indicated in a general way by reference numeral 20.

The frame 14 includes, in the particular form shown, four open rectangular nearly-identical subframes 22 standing on edge and extending from front to rear in transversely-spaced parallel relation. Crosspieces 24 and 26 connect these subframes together at the front while a single crosspiece 28 does so along the bottom at the rear thereof. As illustrated, a short crosspiece 30 is used at the upper rear (FIG. 15) connecting only the two inboard subframes 22 together. Other transversely-extending elements also interconnect the subframes, these taken the form of tray guiderail subassemblies 32 which will be discussed in detail presently in connection with FIGS. 3, 4 and 5.

The racking apparatus shown in essentially free standing although it can, of course, be fastened down to the warehouse floor and made a permanent installation. The vertical load at the upright posts is considerble, therefore, load-spreading pads (not shown) can be used at these and other points of maximum load concentration should the need for them arise.

It becomes apparent that the frame 14 in its basic form is an open-sided box with a floor 34 (FIG. 1) laid over the bottom horizontal frame members 36 of each subframe 22. It contains no partitions and the front and rear ends thereof that have been broadly designated with reference numerals 38 and 40, respectively, carry the horizontally-disposed tray guiderail subassemblies 32 which support the individual trays 12 in tiered relation for independent horizontal rolling movement therealong between retracted and extended positions. Each of the several trays extends lengthwise approximately the full width of the rack and is accessible from both sides of the latter. The right elevator cage 16R when in the extended phantom line position of FIG. 7 services the trays when extended to the right and the left elevator cage does likewise when the trays are extended out in the opposite direction. With the elevator cages retracted into position alongside the center of the rack, both place the operator in position to operate the tray transfer mechanisms. One of these transfer mechanisms is, of course, actuated to extend a selected tray before the need arises to extend the elevator cage into position for monitoring the loading and unloading thereof.

Next, with particular reference to FIGS. 2–6, inclusive, the trays together with the mountings and transfer mechanisms therefore will be described in detail. Each of the several trays in the particular form shown is bordered on both sides by I-beam-like members 42 from which the lower outboard flange has been removed and replaced by a length of sprocket chain 44 connected between spaced connectors 46. The opposed channels 48 on the inside of these beam-like members are bridged by transversely-extending heavy metal ribs or slats 50 arranged in longitudinally-spaced essentially parallel relation beginning at points spaced inwardly slightly from the beam ends. While not illustrated, these slats are preferably removable so that they can be rearranged to provide different spacings to accommodate various size sheets and loads. The slatted tray bed 52 thus formed is ideally suited to accept a load 54 laid atop thereof by the conventional sheet loading and unloading apparatus that has been identified by numeral 56 in FIG. 2. The opposed hooks 58 on opposite ends of the pick-up fingers 60 can lay down the load on the slats and move into extended disengaged position without being interfered with by the latter.

FIG. 3 most clearly reveals the guiderail subassemblies 32 upon which the trays move horizontally between their extended and retracted positions. In the particular form shown, these subassemblies each include a pair of angle iron rails 62 extending crosswise of the front and rear faces 38 and 40 of the frame 14 so disposed relative to one another that a pair of their flanges 64 lie in spaced parallel track-forming relation. A series of rollers 66 fastened to the web 68 of frame elements 42 at spaced intervals throughout the length thereof roll within the track defined between these rails. A cover plate 70 bridges the gap between the track-forming flanges 64 of rails 62 in the particular form illustrated.

In FIGS. 2 and 3, it can be seen that the vertically-disposed flange 72 of the upper rail 62 of each pair also defines a track along which roller 74 depending from the upper outboard flange 76 of beam element 42 can roll. These rollers 74 are mounted for rotation about vertical axes and several of them lie spaced throughout the length of the beam. A like set of rollers is placed on both sides of each tray cooperating with one another to maintain the latter centered with respect to its tracks.

FIGS. 2, 4, 5 and 6 to which detailed reference will now be made all reveal certain features of the tray transfer mechanism 20. Centered beneath each tray in the tier is a longitudinally-extending shaft 76 journalled for rotation within bearing blocks 78 fastened to an extension 80 of the downturned vertical flange 82 of the lower of the pair of guiderails 62. The tray guidance system already described as well as all but one element of the tray transfer mechanism 20 is duplicated on both the front 38 and the rear 40 of the rack. Thus, the drive sprockets 84 fixed to opposite ends of each drive shaft 76 are both operatively engaged in sprocket chains 44 running along the sides of the trays. Clockwise rotation of the drive shaft as viewed in FIG. 5 will, of course, result in the tray associated therewith extending to the left and vice versa. In the particular form shown, each of the sprocket chains is reaved over a pair of vertically-adjustable idler sprockets 86 (FIG. 5) spaced on opposite sides of the drive sprocket that cooperate with the latter to keep the driving connection tight. Turning of the drive shaft, therefore, simultaneously drives both sides of each tray in the same direction and, of course, at the same speed. The only difference between the tray transfer mechanisms on the rear of the rack and those on the front is the presence of an extension 88 on the front shaped to detachably receive a crank or other tray mechanism drive 18 which will be described presently.

Before proceeding with a detailed look at the remaining figures of the drawings, mention should, perhaps, be made of the switch actuator kickers 90 on each tray located spaced inwardly of each end thereof as shown most clearly in FIGS. 2, 4 and 15. These kickers are confined to the rear frame element 42 of each tray. They function in a manner to be explained presently to shut off and partially disable tray transfer drive 18 once a given tray has reached its fully-extended position.

Looking next at FIGS. 1, 7, 8, 9, 10 and 14, it can be seen that each of the outboard front subframe uprights 92 cooperates with the corresponding upright of the inboard subframe adjacent thereto to define a pair of vertically-disposed parallel rails upon which one of the two elevator cages 16 rides up and down the box-like frame. As was previously mentioned, the four subframes 22 are almost exactly alike, but not quite, in that the front uprights 92 of the outboard subframes have marginal flanges 94 thereon that extend outwardly while the corresponding upright 92m of the adjacent inboard subframe has its flange 96 extending inwardly.

Now, each elevator subassembly has a rectangular cage-supporting frame 98 with vertically-disposed angle irons 100 at each end having inturned flanges 102 extending at right angles across the edges of the flanges 94 and 96 on the subframe uprights 92 and 92m as is most clearly revealed in FIG. 8. These inturned flanges are apertured as shown at 104 in FIG. 10 to receive the anti-friction rollers 106 that run along the edges of the subframe upright flanges. Other anti-friction rollers 108 and 110 carried by these same inturned flanges 102 roll along opposite faces of flanges 94 or 96 as the case may be. Thus, rollers 106, one pair of which is located at the top of the frame 98 while a second pair is located at the bottom, cooperate to keep it from tilting or binding as it runs up and down the tracks defined by subframe upright flanges 94 and 96. Outside and inside roller pairs 108 and 110 are, likewise, located at all four corners of cage-supporting frame 98 and they cooperate to keep it from tilting outwardly as it rides up and down its tracks.

FIGS. 1, 7, 8 and 14 all show the wire cages 112 that are attached to the cage-supporting frame 98 for movement between the full line retracted position of FIG. 7 and the phantom line extended one. Grooved rollers 114 (FIG. 8) ride along the parallel top and bottom margins of the frame 98 supporting the cage for transverse movement along the latter between its extended and retracted positions. Other features of the connection between the elevator cage and the supporting frame 98 therefore such as, the limit stops, latches, etc., remain essentially the same as the earlier patent already mentioned and no useful purpose would be served by going over them again. There are, however, certain differences in the elevator hoist mechanism and the controls therefor which will be set forth briefly in connection with FIGS. 1, 7, 14 and 15 to which reference will now be made.

To begin with, a pair of driven shafts 116 are journalled for rotation between the track-forming subframe uprights 92 and 92m at the bottom thereof while a single drive shaft 118 extends all the way across the top in spaced parallel relation above the latter. The upper shaft 118 carries two pairs of transversely-spaced sprockets 120 over which are reaved lengths of sprocket chain 122. Shafts 116, on the other hand, carry simple pulleys 120m vertically aligned with the sprocket 120 thereabove. In the particular form shown, the cage drive comprises half cable 124 and half sprocket chain 122, the sprocket chain part running over the sprocket and down the front of the rack to its point of attachment to the top of the cage-carrying frame 98 while the cable part runs from the other end of the chain underneath by pulley 120m and up to its point of attachment to the bottom of the cage frame as shown most clearly in FIG. 14. The element 122 could, of course, be all sprocket chain but to do so would entail extra expense since only a little over half ever reaches sprocket 120.

The upper of the two shafts 118 comprises the drive shaft of cage-elevating reversible gear motor 128 suspended from the underside of the rack at the front thereof offset to one side of the tray transfer mechanisms and shafts 76 thereof. Mounting the elevator drive motor 128 in the top of the rack has certain advantages in terms of keeping the power cord 134 out of the way and eliminating the more complex and expensive sliding control of the earlier patent.

Mounted in the front of the rack at the top and bottom as seen in FIG. 7 are transversely-spaced pairs of vertically-aligned pulleys 136. Counterweights 132 move up and down the rack behind each elevator cage attached thereto by a cable 140 passing from the counterweight, up and over the top pulley 136 of the pair and down to a point of attachment 138 (FIG. 7) atop the cage-supporting frame 98. A second length of cable 142 attaches to the bottom of the counterweight 132 and is reaved around the lower pulley of each vertically-aligned pair to its point of attachment 144 on the lower edge of the cage frame.

Both elevator cages, of course, share the common drive motor 128 which is reversible and controlled by either one of the two switches 146 mounted on top of the cage-supporting frame for vertical movement therewith. This switch does not move from side to side with the cage because, once the elevator is at the proper height, it is not used while the cage is extended. Actually, elevator drive motor 128 is not controlled directly by switches 146, but instead by a more complex control circuit complete with limit switches, automatic reversing capabilities and other features well known in the elevator control art; however, no useful purpose would be served by detailing such circuitry since it forms no part of the instant invention.

As previously noted, the sliding switch contact of the earlier patent has been done away with and replaced by a counterweighted power cord retraction subassembly that has been most clearly revealed in FIGS. 7, 14 and 15 to which detailed reference will now be made. Power cord 134 is run from switch 146 up over yet another pulley 148 mounted in the top front of the rack and back over the top of the rack to a pulley 150 attached to rear upright 152 of the outboard subframes 22. After passing over the latter pulley, it is reaved through a running block 154 carrying a counterweight 156 and back up again to a junction box 158 mounted on the rear upright 160 of the adjacent inboard subframe 22. Thus, as the elevator moves up and down the front of the rack, the power cord controlling it has the slack taken out of it by counterweight 156 that rides up and down the back of the rack in a direction opposite that of the cage frame 98. From junction box 158, the power cord, of course, connects into the motor control circuit (not shown).

The remaining features of the invention that require detailed examination all have to do with the tray transfer mechanism drive 18 for which purpose reference will be made to FIGS. 7, 9, 11, 12, 13, 15, 16 and 17. On the front of the rack centered between the inboard subframes 22 are a pair of spaced parallel rails 160 attached to the upper and lower crossframe elements 24 and 26, respectively. An open rectangular frame 162 rides up and down the track defined by these rails 160 on rollers 106m and 110m that are mounted and function in a similar manner to their counterparts in the cage-carrying frame 98 already described in detail. In other words, rollers 106m roll along the inside of the rails 160 in much the same way as rollers 106 ride along the edge of flange 96 while rollers 110m similarly roll along the front and rear faces of the aforementioned guiderails. Also, in a manner analogous to the previously-described counterweight systems, a cable 164 is attached to the top edge of frame 162 intermediate the side margins thereof and reaved over pulleys 166 and 168 onto the back side thereof where it is attached to counterweight 170.

In FIGS. 12 and 13, it can be seen that side frame elements 172 each carry a vertically-spaced pair of fixed blocks 174 having opposed V-shaped grooves 176 therein that receive V-shaped slides 178 for horizontal slidable movement toward and away from the box-like frame 162.

Particularly in FIG. 12, it can be seen that a rectangular tool carriage 180 carries slide blocks 178 in the corners thereof and also mounts the reversible electric tray actuator drive motor 182. This drive includes a female chuck 184 adapted to mate and form a driving coupling with selected shaped extensions 88 (FIG. 6) used to drive the trays in and out. By pulling carriage 180 out toward the operator, chuck 184 disengages from the shaft to which it was operatively coupled thus enabling the rail-mounted frame 162 to be raised or lowered as desired to another level on tracks 160 preparatory to reconnecting it to another of the tray transfer mechanisms; whereupon, moving the carriage inwardly again and, perhaps, rotating the chuck a few degrees will accomplish the desired driving connection since not all the shafts will stop in a position for the chuck to receive them. It should, perhaps, be mentioned that the loads carried by the trays are usually so heavy that manual actuation of the trays becomes impractical; hence, the need for the electrically-powered unit.

FIGS. 9, 11 and 12 show the junction box 186 with the power cord 188 emerging therefrom. This box together with the three control switches 190 are all mounted for movement with frame 162 on a bracket 192 attached to the latter. Thus, the tool carriage moves in and out independently of the switches controlling the drive carried thereby.

Of the three switches 190, 190L and 190R, one 190 is an on/off switch while the other two 190R and 190L are directional control switches that are operative to arcuate the drive in a particular direction, i.e. right or left. With the on/off switch "on", at least one of the directional control switches, and perhaps both, become operative to rotate the chuck into position to receive the drive shaft coupling 88. Under certain conditions, however, one or the other of the directional control switches is disabled thus preventing its being used to extend a tray. One switch of the two always remains operative to retract a tray and, upon retraction of an extended tray, the companion directional control switch becomes operative again in a manner which will now be set forth in detail in connection with FIGS. 15, 16 and 17.

Journalled for rotation in the back of the rack offset to one side of the counterweight 170 and its support cable 168 is a vertically-disposed shaft 194. Fastened to this shaft normally extending straight forwardly out over the adjacent side margins of the trays in the path of the kickers 90 as shown in FIG. 16 are a series of arms 196. Each tray, as it moves into fully-extended position on either side of the rack, will cause one of its kickers 90 to engage the arm 196 aligned therewith and rotate the shaft one direction or the other, shaft 194 having been shown rotated to the left in FIG. 15.

On the very top of shaft 194, it carries a plate 198 rotatable therewith. This plate is essentially horizontal and it has a notch 200 on one side of the shaft and a somewhat larger generally V-shaped notch 202 on the other. Underneath notch 200 and offset on the same side of shaft 194 is a three-position switch 204 mounted on a suitable bracket 206 fastened atop the uppermost tray guiderail 72. The switch is of a standard type having a rotatable post 208 movable from a centered position to either of two shifted positions on opposite sides of its centered position. As illustrated, a crank arm 210 is attached to the post extending out over notch 200 in plate 198 where it carries a roller 212 seated in the latter. Clockwise rotation of shaft 194 and plate 198 carried atop thereof into the phantom line position shown in FIG. 17 will, of course, shift the switch from its centered position rearwardly. This rearward actuation of switch 204 is, of course, the result of a tray moving into extended position out the left side of the rack as viewed by the operator (FIG. 7). Switch 204 is so connected in the circuit controlling tray drive 18 that the winding of the motor which functions to turn chuck 184 anti-clockwise is opened and disabled. Thus, as soon as switch 204 is actuated to its rear position shown in phantom lines by clockwise rotation of shaft 194, the tray being extended to the left stops since the electric motor driving chuck 184 has shut off. As such, switch 204 overrides the left direction control switch 190L by opening the circuit containing same. Now, in the rear position just described, switch 204 leaves the motor winding active which will turn chuck 184 clockwise upon actuation of right direction control ssitch 190R to its closed position. This means, of course, that once the extended tray is loaded or unloaded as the case may be, closure of the main on/off switch 190 along with right directional control switch 190R will start the chuck drive motor through closed contacts of switch 204 connected to the clockwise motor winding.

Now, as soon as the extended tray starts to the right back into the rack, its kicker 90 on the right end leaves arm 196 and frees shaft 194 along with its plate 198 to return to its centered full line position. It is normally biased into this centered position by an arm 214 mounted for limited angular movement about a vertical axis 216 intermediate its ends located on the opposite side of shaft 194 from the switch 204. This arm 214 also carries a roller 218 on one end that is received within the V-shaped notch 202 in plate 198. A tension spring 220 is attached to the opposite end of arm 214 and to a fixed abutment 222 forming a part of mounting bracket 224. Abutment 222, spring 220, and arm 214 are aligned with shaft 194 and the bottom of the V-shaped notch when plate 198 is positioned to place switch 204 in centered position, this being the full line relationship of the parts shown in FIG. 17. With these parts shifted into the phantom line position of FIG. 17, tension spring 220 is, of course, stretched and it acts to bias arm 214 back into its full line centered position to which it returns as soon as the tray kicker 90 releases arm 196. It should be noted that there are many other arrangements for biasing the switch 204 into its centered position including springs within the switch itself; however, the particular mechanism shown is advantageous since it is positive, visible to the operator and powerful enough to insure that shaft 194 always returns to its neutral position in which the arms 196 carried thereby face directly to the front.

While positive mechanical stops (not shown) are also used to insure that the trays can only extend out about one-third of their overall length, cut-off switch 204 is fully effective for this same purpose since as soon as the power to a particular winding of chuck drive motor 182 is cut-off, the tray coasts an inch or two to a complete stop. It should be apparent also that once a tray is extended fully, the tray drive cannot be actuated to extend a second tray out the same side of the rack. Conceivably, the tray transfer drive could be shifted to another tray and actuated to send a tray into extended position on the opposite side of the rack since the reverse direction drive remains active; however, as a practical matter, this is never done and all the operations on a given tray are completed before working with another. As a matter of fact, it is very often difficult to release the chuck from one shaft for placement on another when the chuck can only be turned in one direction as it not infrequently binds a bit on the shaft. On the other hand, with all the trays retracted and the tray actuator drive fully operative, it becomes a simple matter to align the chuck axially with a particular shaft and rotate it one way or the other a few degrees to make the driving coupling therebetween. This becomes possible as soon as the shaft 194 frees switch 204 to return to its centered position.

Finally, a few words of further explanation need to be said concerning on/off switch 190 and the right and left direction control switches 190R and 190L associated therewith. Switch 190 is a simple two position switch that will remain in either its "on" or "off" positions without being held. Conversely, both the direction control switches are normally biased into open position and must be held closed. Accordingly, when the operator wishes to extend a tray to the left, he must first actuate the on/off switch to its "on" position and then hold left position switch 190L actuated until the tray reaches its fully-extended position, whereupon, the cut-off switch will function to cut-off the circuit rotating the chuck anti-clockwise. Once the chuck stops rotating and the tray coasts to a stop, switch 190L can be released to its open position since it is no longer a functional part of the motor control circuit. Following completion of the operations with the extended tray, right direction control switch 190R is held closed and the chuck turns clockwise through the circuit that remains complete across the closed contacts of switch 204.

What is claimed is:

1. The apparatus for racking sheet materials and the like which comprises: an open-sided generally box-like frame having front and rear end walls; rails carried by said end walls cooperating with one another to define a plurality of horizontal tray-receiving tracks arranged in vertically-spaced relation; a single tier of flat-bottomed trays each having side frame members supporting same on said tracks for horizontal movement between a retracted position essentially centered within said frame and either one of two extended positions overhanging a side of the latter; tray transfer means carried by each tray accessible at vertically-spaced positions on the same end wall of the frame for shifting said trays independently of one another between their retracted and either of their extended positions; first vertically-disposed rail means carried by the frame on the end wall thereof where the tray transfer means are accessible; carriage means mounted on said first vertically-disposed rail means for vertical movement thereon to positions where access can be had to each of the tray transfer means; horizontally-disposed rail means carried by said carriage means extending longitudinally of the frame; and reversible tray transfer drive means mounted on said horizontaly-disposed rail means for longitudinal movement thereon between a disengaged position and an engaged position operatively coupled to one of said tray transfer means when longitudinally-aligned therewith.

2. The sheet material racking apparatus as set forth in claim 1 in which: the bottoms of the trays comprise a plurality of transversely-extending slats arranged in longitudinally-spaced relation between the front and rear end walls thereof.

3. The sheet material racking apparatus as set forth in claim 1 in which: the first vertically-disposed rail means is positioned on the end wall of the frame intermediate the side margins thereof; and second and third vertically-disposed rail means are located on said same end wall spaced on opposite sides of said first vertically-disposed rail means carried thereby; a pair of cage-carrying frames are mounted upon said second and third vertically-disposed rail means for vertical movement therealong; an elevator cage mounted on each of said cage-carrying frames for vertical movement therewith; and means for raising and lowering said elevator cages.

4. The sheet material racking apparatus as set forth in claim 1 in which: a first electrical circuit is connected to the tray transfer drive means operative upon energization to actuate same in one direction and a second electrical circuit is connected to the tray transfer drive means operative upon energization to actuate said tray transfer drive means in the opposite direction; a cut-off switch is connected into both of said first and second circuits, said switch having a closed position leaving both circuits capable of being energized, a first open position effective to open said first circuit while leaving said second circuit capable of energization, and a second open position effective to open said second circuit while leaving said first circuit capable of being energized; and switch-actuating means responsive to movement of each ray into either of its extended positions, said actuating means and cut-off switch cooperating with one another to maintain the latter in closed position when all the trays are retracted, and said actuating means being operative upon movement of a tray into extended position to actuate said cut-off switch into the open position thereof that is effective to prevent energization of said tray-transfer drive means in a direction to further extend said extended tray.

5. The sheet material racking apparatus as set forth in claim 3 in which: each elevator cage is mounted on its cage-carrying frame for independent transverse movement thereon between a retracted position alongside the first vertically-disposed rail means in position to operate the tray transfer drive means carried thereon and an extended position projecting laterally beyond said box-like frame in position for an operator standing therein to view a tray extended on the same side thereof.

6. The sheet material racking apparatus as set forth in claim 3 in which: the means for raising and lowering said elevator cages comprises a single reversible electric motor, a pair of hoist mechanisms connected to the cage-carrying frames for raising and lowering the cages carried thereby, power transfer means operatively interconnecting the single electric motor drive with both hoist mechanisms, said transfer means being effective to simultaneously actuate the latter, and a pair of motor control circuits connected between each cage-carrying frame and the common drive therefor, said circuits being independently operative upon actuation from one of the elevator cages to control the movements of both.

7. The sheet material racking apparatus as set forth in claim 4 in which: the cut-off switch is effective to de-energize circuit and stop the extension of the extending tray at a point where substantially less than half the latter overhangs the side of the box-like frame.

8. The sheet material racking apparatus as set forth in claim 4 in which: the first and second electrical circuits each include normally-open switches.

9. The sheet material racking apparatus as set forth in claim 6 in which: the power transfer means is effective upon actuation to actuate both hoist mechanisms in the same direction at substantially the same speed.

10. The sheet material racking apparatus as set forth in claim 6 in which: a pair of normally-open switches are located at each cage-carrying frame, one of said switches being operative upon actuation to energize the motor control circuit for raising the elevators and the other of said switches being similarly operative to control the motor control circuit for lowering the elevators.

* * * * *